United States Patent [19]
Wang

[11] Patent Number: 5,713,230
[45] Date of Patent: Feb. 3, 1998

[54] GEARSHIFT-STICK LOCKING ASSEMBLY WITH FLUORESCENT SHACKLE-POSITIONING RUBBER FRAME

[76] Inventor: Nana Wang, No. 155, Min-Chu Rd., Taichung City, Taiwan

[21] Appl. No.: 831,015

[22] Filed: Mar. 31, 1997

[51] Int. Cl.⁶ .................................................. B60R 25/06
[52] U.S. Cl. ..................... 70/247; 70/55; 70/454; 70/441; 70/201
[58] Field of Search ..................... 70/38–39, 54–56, 70/201–203, 238, 233, 441, 454, 460, 463, 237, 245–248

[56] References Cited

U.S. PATENT DOCUMENTS

| | | | |
|---|---|---|---|
| 3,848,440 | 11/1974 | Manuel | 70/55 |
| 4,134,280 | 1/1979 | Pelavin | 70/55 |
| 4,295,350 | 10/1981 | Grinage | 70/454 |
| 4,693,099 | 9/1987 | Cykman | 70/247 |
| 5,228,320 | 7/1993 | Liou | 70/247 |
| 5,291,765 | 3/1994 | Hoisington | 70/233 |
| 5,295,375 | 3/1994 | Jonas | 70/247 |
| 5,454,244 | 10/1995 | Liou | 70/247 |
| 5,487,286 | 1/1996 | Wu | 70/247 X |
| 5,653,365 | 8/1997 | Lee | 70/233 X |

Primary Examiner—Suzanne Dino
Attorney, Agent, or Firm—Shlesinger, Arkwright & Garvey LLP

[57] ABSTRACT

A gearshift-stick locking assembly includes a padlock body, an annular fluorescent seat and a shackle. The seat is shaped as a rectangular frame and is made of a rubber containing a fluorescent material. The padlock body has a top surface and a mushroom-shaped projection which projects integrally from the top surface so as to define therebetween an annular groove within which the frame is engaged. The frame has two curved opposite side surfaces each of which defines a shackle-positioning slot. The legs of the shackle are engaged fittingly within the slots. Preferably, each of the curved opposite side surfaces of the frame is provided with several longitudinally extending ribs and bumps for contact with the legs of the shackle.

4 Claims, 4 Drawing Sheets

GEARSHIFT-STICK LOCKING ASSEMBLY WITH FLUORESCENT SHACKLE-POSITIONING RUBBER FRAME

BACKGROUND OF THE INVENTION

1. Field of the Invention

This invention relates to a gearshift-stick locking assembly, more particularly to a gearshift-stick locking assembly which has a fluorescent shackle-positioning rubber frame.

2. Description of the Related Art

Referring to FIGS. 1 and 2, a conventional gearshift-stick locking assembly 10 made of metal is shown to include a padlock body 11 and a shackle 12. The padlock body 11 is fixed on a vehicle (not shown) and has a projection 111 which projects upward from the top surface 110 thereof and which has two wings 112 so as to define two accommodation spaces 113 between the top surface 110 and the wings 112. Two U-shaped metal support members 114 are fixed on the top surface 110 of the padlock body 11 under the wings 112. Each of the support members 114 has two curved surfaces 115 to support one leg 121 of the shackle 12 thereon, thereby confining the legs 121 of the shackle 12 within the accommodation spaces 113. In use, the legs 121 of the shackle 12 can be disengaged from the accommodation spaces 113 so as to lock the shackle 12 onto the padlock body 11 in such a manner that the gearshift stick of the vehicle is enclosed by the shackle 12. The conventional lock 10 suffers from the following disadvantages:

(1) Because the wings 113 and the support members 114 are made of metal, while the vehicle is moving and vibrates, the legs 121 of the shackle 12 may slide in the accommodation spaces 113, thereby generating noise which results from friction between the shackle 12 and the wings 112 and between the shackle 12 and the support members 114 and possibly separating the shackle 12 from the padlock body 11.

(2) When the vehicle is to be started in a parking place in the dark, it is difficult to insert accurately the legs 121 of the shackle 12 into the accommodation spaces 113 between the wings 112 and the support members 114 due to the fact that the curved surfaces 115 cannot be seen clearly.

SUMMARY OF THE INVENTION

An object of this invention is to provide a gearshift-stick locking assembly in which a shackle can be positioned firmly on a padlock body when it is not in use.

Another object of this invention is to provide a gearshift-stick locking assembly with a fluorescent shackle-positioning device, whereby a shackle can be easily placed in position on a padlock body even if it is used in the dark.

According to this invention, a gearshift-stick locking assembly includes a padlock body fixed in a vehicle, an annular fluorescent seat and a shackle. The padlock body has a top surface, and a mushroom-shaped projection which protrudes integrally and upwardly from the top surface so as to define an annular groove therebetween. The annular fluorescent seat is made of rubber and is shaped as a rectangular frame which is engaged fittingly within the annular groove of the padlock body so as to be sleeved fixedly on the padlock body. The rubber contains a fluorescent material. The seat has two curved opposite side surfaces, each of which defines a shackle-positioning slot. The shackle has a pair of parallel legs which are respectively and fittingly engaged within the slots of the frame so as to position the shackle on the padlock body. Because the frame is made of rubber, the shackle can be positioned firmly on the frame.

Preferably, each of the curved opposite side surfaces of the frame has several longitudinally extending parallel ribs formed thereon in a middle portion of the corresponding slot, and two bumps formed thereon in two end portions of the corresponding slot so as to reduce friction between the frame and the legs of the shackle resulting from sliding movement of the legs of the shackle in the slots. Accordingly, insertion of the legs of the shackle into the slots and disengagement of the former from the latter can be easily effected.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
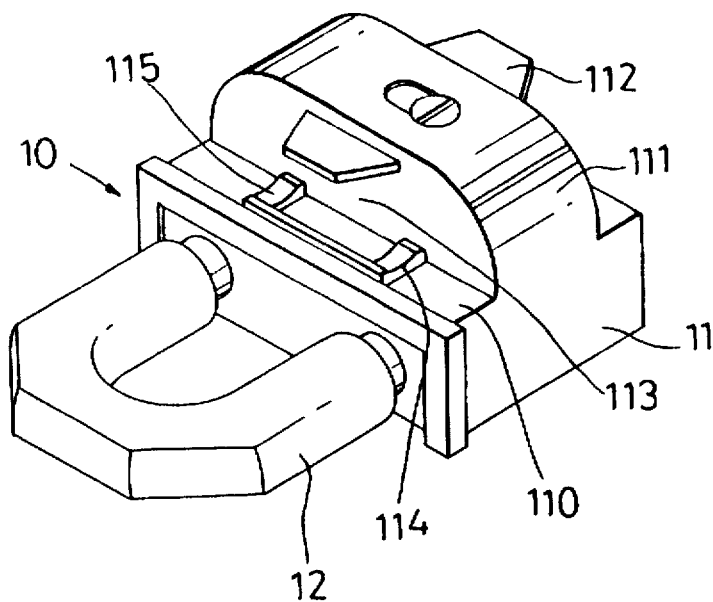
FIG. 1 is a perspective view of a conventional gearshift-stick locking assembly.
Figure 2:
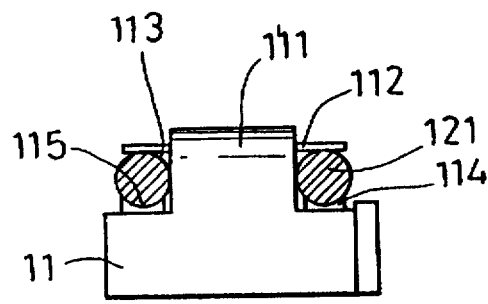
FIG. 2 is a sectional view of the conventional gearshift-stick locking assembly.
Figure 3:
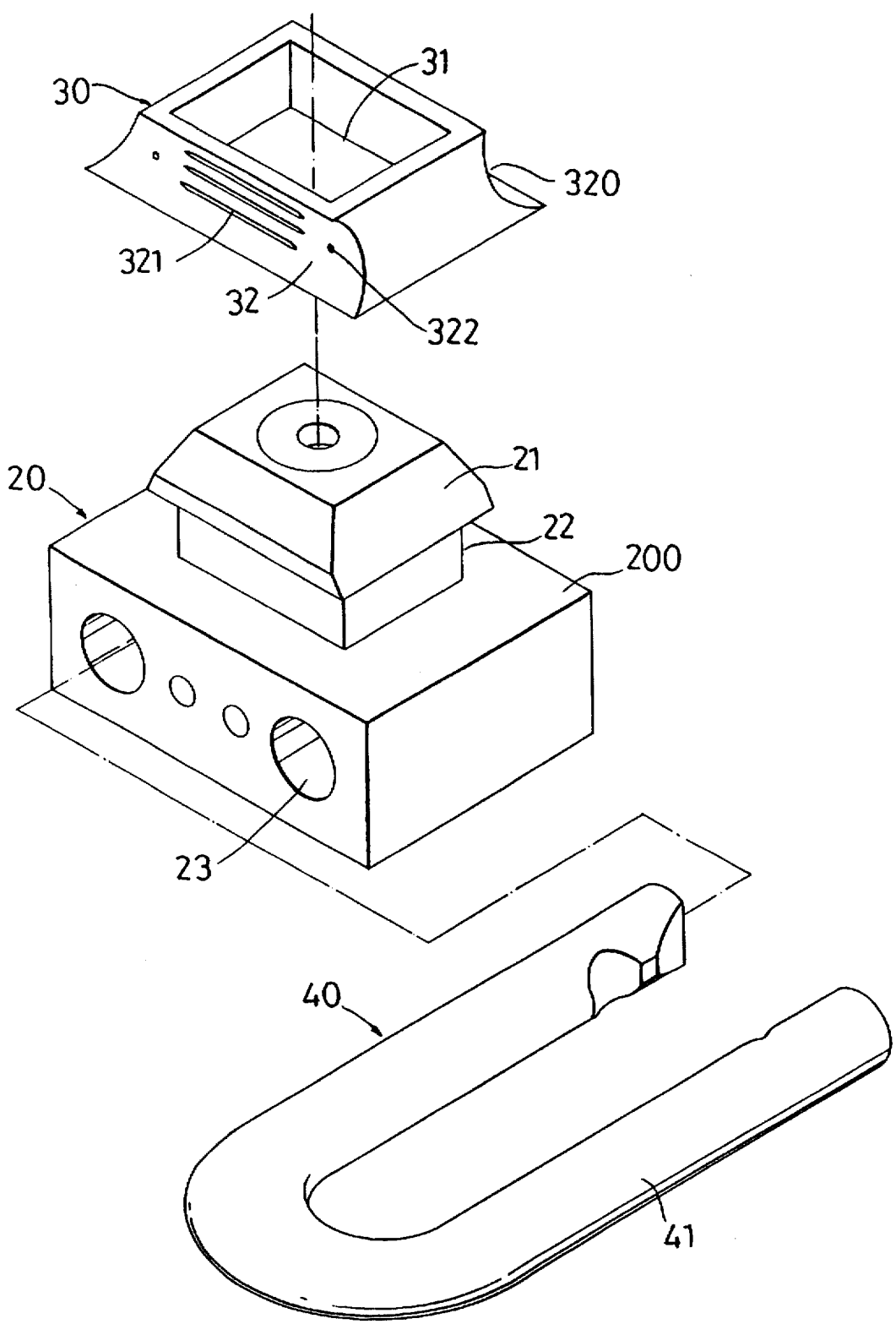
FIG. 3 is an exploded view of a gearshift-stick locking assembly according to this invention.
Figure 4:
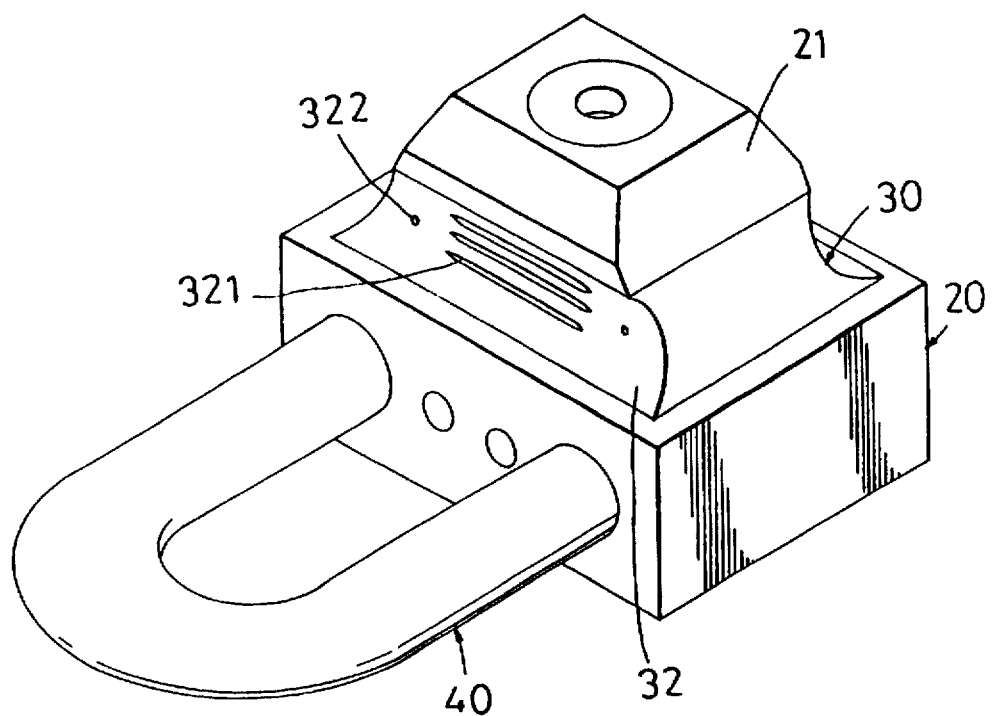
FIG. 4 is a perspective view of the gearshift-stick locking assembly according to this invention.
Figure 5:
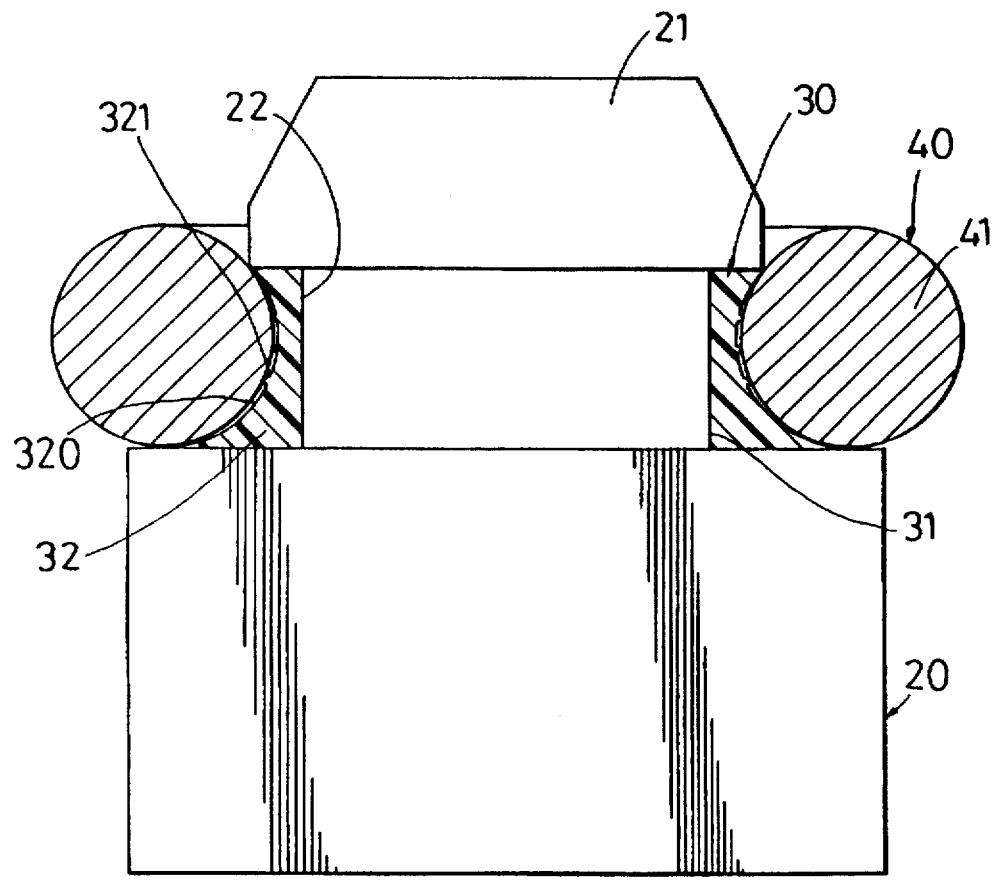
FIG. 5 is a schematic view of the gearshift-stick locking assembly according to this invention, illustrating how a shackle is positioned on a padlock body.

Referring to FIGS. 3, 4 and 5, a gearshift-stick locking assembly of this invention includes a padlock body 20, an annular fluorescent seat 30 shaped as a rectangular frame and made of a rubber containing a fluorescent material, and a shackle 40 having a pair of parallel legs 41. The frame 30 defines an opening 31.

The padlock body 20 has a top surface 200 and a mushroom-shaped projection 21 projecting integrally and upwardly from the top surface 200 so as to define an annular groove 22 therebetween.

The frame 30 is engaged fittingly within the annular groove 22 of the padlock body 20 so as to be sleeved fixedly on the padlock body 20, and has two curved opposite side surfaces 32, each of which defines a shackle-positioning slot 320.

The legs 41 of the shackle 40 are respectively and fittingly engaged within the slots 320 of the frame 30 so as to position the shackle 40 on the padlock body 20. In use the legs 41 engage holes 23 in the body 20.

As illustrated, each of the curved opposite side surfaces 32 of the frame 30 has three longitudinally extending parallel ribs 321 projecting therefrom and located in a middle portion of the corresponding slot 320, and two bumps 322 projecting therefrom and located in two end portions of the corresponding slot 320.

The locking assembly of this invention has the following advantages:

(1) Because the frame 30 is made of rubber, the legs 41 of the shackle 40 can be positioned firmly on the frame 30.

(2) Little noise is created between the legs 41 of shackle 40 and the fluorescent shackle-positioning rubber frame 30 when inserting the legs 41 of the shackle 40 into the slots 320 of the frame 30 and when separating the former from the latter.

(3) Provision of the ribs 321 and bumps 322 reduces the engagement area between the frame 30 and the legs 41 of the shackle 40 so as to diminish the friction therebetween. In this way, insertion of the legs 41 of the shackle 40 into the slots 320 of the frame 30 and separation of the former from the latter can be easily effected.

With this invention thus explained, it is apparent that numerous modifications and variations can be made without departing from the scope and spirit of this invention. It is therefore intended that this invention be limited only as indicated in the appended claims.

I claim:

1. A gearshift-stick locking assembly comprising:

a padlock body having a top surface, and a mushroom-shaped projection projecting integrally and upwardly from said top surface so as to define an annular groove therebetween;

an annular fluorescent seat made of rubber and shaped as a rectangular frame which is engaged fittingly within said annular groove of said padlock body so as to be sleeved fixedly on said padlock body, said rubber containing a fluorescent material, said seat having two curved opposite side surfaces, each of which defines a shackle-positioning slot; and a shackle having a pair of parallel legs which are respectively and fittingly engaged within said slots of said frame so as to position said shackle on said padlock body.

2. A gearshift-stick locking assembly as claimed in claim 1, wherein each of said curved opposite side surfaces of said frame has several parallel ribs projecting therefrom so as to reduce friction between said frame and said legs of said shackle resulting from sliding movement of said legs of said shackle in said slots.

3. A gearshift-stick locking assembly as claimed in claim 2, wherein said ribs extend along length of said slots.

4. A gearshift-stick locking assembly as claimed in claim 3, wherein said ribs are located in middle portions of said slots, each of said curved opposite side surfaces of said frame further having two bumps projecting therefrom, which are located in two end portions of a corresponding one of said slots.

* * * * *